United States Patent
Freiberger et al.

(10) Patent No.: US 7,773,865 B2
(45) Date of Patent: Aug. 10, 2010

(54) ASSEMBLY FOR CONDUCTING AND TEMPERING FLUIDS AND METHOD FOR PRODUCING SAID ASSEMBLY

(75) Inventors: Sylvia Freiberger, Rehau (DE); Michael Schöbel, Selb (DE); Lutz Görmer, Rehau (DE); Gerhard Ruckdäschel, Weissenstadt (DE); Richard Ebert, Thurnau (DE); Michael Weber, Schwarzenbach/W. (DE)

(73) Assignee: Rehau AG & Co., Rehau (DE)

( * ) Notice: Subject to any disclaimer, the term of this patent is extended or adjusted under 35 U.S.C. 154(b) by 853 days.

(21) Appl. No.: 11/704,324

(22) Filed: Feb. 9, 2007

(65) Prior Publication Data

US 2008/0012293 A1    Jan. 17, 2008

(30) Foreign Application Priority Data

Feb. 9, 2006    (DE) .................... 10 2006 006 211

(51) Int. Cl.
*F22B 29/06*    (2006.01)
*F16L 39/00*    (2006.01)
(52) U.S. Cl. .................... 392/398; 285/133.11
(58) Field of Classification Search ......... 392/386–406; 137/340, 341; 138/32, 33, 34, 35; 285/133.11, 285/41
See application file for complete search history.

(56) References Cited

U.S. PATENT DOCUMENTS

| | | | |
|---|---|---|---|
| 3,055,750 A * | 9/1962 | De Carolis | .................... 48/103 |
| 3,327,763 A * | 6/1967 | Sautray et al. | ................. 159/14 |
| 3,373,726 A * | 3/1968 | Albrecht | .................... 123/549 |
| 3,632,042 A | 1/1972 | Goulish | |
| 5,522,453 A | 6/1996 | Green | |
| 5,892,888 A * | 4/1999 | Romero | .................... 392/501 |
| 6,315,331 B1 | 11/2001 | Krause et al. | |

FOREIGN PATENT DOCUMENTS

| | | |
|---|---|---|
| DE | 3414284 A1 | 10/1985 |
| DE | 91 09 526.3 | 10/1991 |
| DE | 692 21 918 T2 | 4/1998 |
| DE | 202 09 897 U1 | 1/2003 |
| DE | 20 2004 018697 U1 | 2/2005 |
| EP | 1 070 642 A | 1/2001 |
| WO | WO 86/04868 A | 8/1986 |
| WO | WO 98/16769 | 4/1998 |
| WO | WO 02/38426 A | 5/2002 |

OTHER PUBLICATIONS

European Search Report dated Jun. 18, 2007, Application No. 06 02 5810.

* cited by examiner

*Primary Examiner*—Daniel Robinson
(74) *Attorney, Agent, or Firm*—Venable LLP; Robert Kinberg; Ryan M. Flandro (57) ABSTRACT

An assembly for conducting and tempering a fluid includes at least one connector having at least three outlets/intakes. A hose is attached to a first one of the outlets/intakes of the at least one connector. A tempering device is arranged inside a cavity of the hose and extends outside the hose through a second one of the outlets/intakes of the connector positioned approximately opposite the first outlet/intake. Fluid is conducted in the cavity of the hose between the outer wall of the hose and the tempering device. A third one of the outlets/intakes of the connector communicates with the cavity of the hose. The hose and tempering device are each connected to the connector by either a form-fitting or material-to-material connection.

26 Claims, 3 Drawing Sheets

ASSEMBLY FOR CONDUCTING AND
TEMPERING FLUIDS AND METHOD FOR
PRODUCING SAID ASSEMBLY

CROSS-REFERENCE TO RELATED
APPLICATION

This application claims the priority of German Patent Application No. 10 2006 006 211.6, filed on Feb. 9, 2006, the subject matter of which is incorporated herein by reference.

BACKGROUND OF THE INVENTION

The present invention relates to an assembly for conducting and tempering fluids, as well as to a method for producing said assembly.

Certain types of fluid or gaseous media must be tempered while being conduced through hoses because these fluid or gaseous media are free-flowing or chemically resistant only within a specific temperature range.

An example of this type of fluid is a carbamide-water solution in accordance with DIN 70070 and CEFIC (European Chemical Industry Council) Regulations, which is added to the combustion gases of diesel engines, primarily to lower the emission of nitrogen oxide in order to meet the higher standards for exhaust emissions. When conducting the carbamide-water solution from a tank to the location where it is injected into the combustion gases of the diesel engine through a hose, it is necessary to equip the hose with means of tempering the solution, because, due to its chemical composition, the carbamide-water solution tends to coagulate or freeze at minus 11° C. The carbamide-water solution includes other negative characteristics such as corrosion and, depending on the temperature, creep.

Conventional hoses containing a heat conductor that is arranged inside the hose wall or fitted spirally around the circumference of the hose in longitudinal direction are known in the related art and are commercially available. In these conventional hoses, however, some of the energy generated for heating is released unused into the environment. Accordingly, in order to reduce the amount of energy required for heating the hose, recent developments in the field have shown a tendency towards using hoses having an internal heating mechanisms.

The difficulty with using a hose having an internal heating is that when connecting the hose to a connector, there is often leakage losses at the connecting region between the hose and the connector. Further, when connecting the hose to a connector, it is also difficult to separate the internal heating from the hose lumen in order to allow easy flow of the fluid in the connecting region.

SUMMARY OF THE INVENTION

It is an object of the present invention to provide an assembly, and a method for producing the assembly, for joining a connector to a fluid-conducting hose with internal heating that would minimize leakage losses.

It is a further object of the present invention to provide such an assembly and method wherein there is provided a separation between the internal heating device and the hose lumen, through which the fluid is conducted, especially a carbamide-water solution.

The above and other objects are achieved by the invention wherein there is provided, according to one embodiment, an assembly for conducting and tempering a fluid, comprising: at least one connector having at least three outlets/intakes; at least one hose having an outer wall enclosing a cavity and being attached to a first one of the outlets/intakes of the at least one connector; and at least one tempering device arranged inside the cavity of the hose and extending outside the hose through a second one of the outlets/intakes of the connector positioned approximately opposite the first outlet/intake, the fluid being conducted in the cavity of the hose between the outer wall and the tempering device; wherein a third one of the outlets/intakes of the connector communicates with the cavity of the hose, and the hose and tempering device are each connected to the connector by one of a form-fitting or material-to-material connection.

In contrast to conventional hoses employing external heating mechanisms, the invention permits a reduction in the total hose diameter, which is advantageous when hoses are bundled together or used in vehicles.

With the assembly according to embodiments of the invention, the leakage losses are reduced as a result of the form-fitting and/or material-to-material connection between connector and hose, as well as between connector and tempering device arranged inside of the hose.

In the assembly according to the foregoing embodiment, the tempering device extends through the connector to the second outlet/intake, which is positioned approximately opposite the first one. Using form-fitting and/or material-to-material connection between the tempering device and the connector, the cavity between tempering device and hose is sealed off from the second outlet/intake. The third outlet/intake of the connector is connected to the cavity between tempering device and hose via an opening, so that the fluid can flow from the hose through the third outlet/intake of the connector. This embodiment of the connector makes it possible to have a separation between the tempering device and the hose in at least one end of the hose.

Most fluids have a lower temperature limit, below which the conducted fluid will freeze or coagulate. Thus, the tempering device arranged in the hose lumen is used only for heating the conducted medium.

An electrical heat conductor that is arranged in the hose lumen has proven to be an efficient tempering device. Accordingly, some embodiments of the present invention are developed using an electrical heat conductor as the tempering device. To protect the electrical heat conductor against corrosion, caused by the conducted fluid, further embodiments of the present invention electrically insulate the heat conductor, i.e., provide the heat conductor with an insulating layer or a diffusion blocking layer, wherein the insulating material is chemically resistant and diffusion-impermeable to the fluid to be conducted. It is also possible to use a plurality of electric heat conductors as the tempering device.

In some instances, it may also be necessary to keep the fluid temperature below a certain limit. Such may be the case, for example, where the fluid is not chemically stable above a certain temperature. Therefore, in embodiments of the present invention, a hose, in which a liquid or gaseous medium is conducted, may be used as the tempering device. The hose-in-hose arrangement created in this way consists of an outer hose (outside hose), in which the fluid to be tempered is conducted, and an inner hose, in which a liquid or gaseous medium flows. In such embodiments, the temperature of the medium conducted through the inner hose is controlled such that heat can be transferred from the tempering device (i.e. inner hose) to the fluid or vice versa, therefore allowing the temperature of the fluid to be held at a constant level.

Embodiments of the present invention may also employ a combination of the hose-in-hose arrangement and an electrical heat conductor as the tempering device.

In some embodiments, the electrical heat conductor advantageously consists of a metal alloy, preferably selected from the group of chromium-nickel steels, nickel alloys, and nickel-copper alloys. To prevent a short circuit in cases where several electrical heat conductors are used, the electric heat conductors may be electrically insulated against each other.

In embodiments of the present invention using a hose-in-hose arrangement, the inner hose can have a multilayer composition, wherein the different layers ensure a better blocking effect between the lumen of the inside hose and the lumen of the outside hose. In particular, the layers can prevent diffusion of the conducted fluid into the inside hose.

The fluid-conducting hose having the tempering device arranged therein can also comprise several layers. The pressure resistance of the hose can furthermore be increased by including a reinforcing layer in the multilayer composition, for example a non-woven, textile, or foil layer.

In some embodiments, in order to trace the assembly in motor vehicles, a marking may be applied to the hose (i.e. the inner or outer hose), which can be printed on, stamped-in, and/or otherwise attached to the surface of the hose.

In further embodiments, the surface of the inner hose and/or the outer hose can be provided with a color, or can be multi-colored, thus making it possible to optically detect and assign the hose in the vehicle. Patterns can be stamped-in or stamped-onto the hose surface.

In a preferred embodiment of the present invention, where the nominal fluid pressure is 0.6 MPa, the operational temperature for the assembly may preferably range from negative 35° C. to positive 100° C. Therefore, the selection of the assembly material is substantially determined by the medium to be conducted and the operating temperature range. When using the assembly for conducting and tempering a carbamide-water solution, it is advantageous if the material for the connector, the hose, and/or the tempering device, at least in the regions coming in contact with the carbamide-water solution, is selected from the family of polyamide (PA), in particular PA 12, PA 12 with blends, PA 6.6, or PA 11; or the family of polyphenyl sulfides (PPS), polyphthalamides (PPA), polyether ether ketones (PEEK), or polyether imides (PEI). To increase the rigidity and strength of the material, glass fibers and/or carbon fibers can also be added to these polymers. The connector may also advantageously be made of metal or ceramics.

When conducting and tempering other fluids, the material used for connector, hose, and tempering device may be selected accordingly, at least in the regions coming in contact with the fluid.

Embodiments of the present invention may further comprise a protective sleeve to insulate the assembly thermally against the environment. The protective sleeve, which may even be a partial protective sleeve, is preferably comprised of two half shells, which can be arranged to wrap around the assembly. This thermal protective sleeve can consist of foamed materials such as foamed polymers, in particular polyurethane, foamed silicon rubber, or foamed ceramics or glass, as well as glass wool, fireclay, vermiculite, or non-woven polymer material. The protective sleeve can further comprise multiple layers, wherein the surface can be provided with a metal layer that additionally reflects the radiated heat. A lamella-type configuration of thin metal foils and foamed material can also be used, which would further improve the heat insulation. The protective sleeve can also be used for thermally insulating other units or devices, which are operatively connected to the assembly. In addition to, or instead of, using the protective sleeve to insulate the assembly, it is also possible to build the hose from a polymer foam layer, using the co-extrusion technique, so that the hose wall forms a thermal insulation from the environment.

According to another aspect of the invention there is provided a method for producing the assembly for conducting and tempering a fluid as described above, wherein in one embodiment the method includes: a) arranging the tempering device in the cavity of the hose with the tempering device having a projecting section that extends beyond at least one end of the hose; b) closing off the cavity between the tempering device and the hose on the one end of the hose; c) inserting the closed end of the hose with the tempering device projecting therefrom into a cavity of an injection-molding tool so that the tempering device and the hose project out of the cavity of the injection molding tool, the cavity of the injection molding tool being shaped to form the connector; d) injection molding the connector while simultaneously insert-molding an area of transition between the tempering device and the closed end of the hose to form the connection between the hose and the connector and between the connector and the tempering device to form an assembly comprising the connector, tempering device and hose; e) removing of the assembly from the injection-molding tool once it has cooled down; and f) creating an opening that communicates with the cavity of the hose and the third outlet/intake of the connector.

In embodiments of the present invention according to this method, at least one end of the hose with the tempering device inserted into its lumen is positioned relative to the tempering device so that the tempering device extends past the end of the hose. The projecting section of the tempering device is advantageously selected to be longer than the distance between the first and second outlet/intake on the connector. According to this method, the connections between connector and the hose and between the connector and tempering device are formed during the production of the connector. Therefore, the cavity between tempering device and hose must be closed off at the hose end before injection-molding of the connector in order to prevent material, generated during the injection-molding of the connector, from entering the cavity and blocking it off.

In one embodiment, a closing element is fitted over the projecting section of the tempering device until it reaches the hose, thereby closing off/sealing the cavity between the tempering device and the hose. The closing element can also project slightly into the cavity of the hose, so as to permit a better fixation.

The closing element may also be arranged between the hose and the tempering device, wherein the hose form-fittingly encloses the closing element so that the closing element is arranged inside the hose lumen. The closing element may include a cavity through which the fluid is conducted. At the one end of the hose, the cavity of the closing element becomes smaller to match the cross-section of the tempering device. When the tempering device is inserted into the hose, it is held frictionally secure inside the cavity of the closing element. The cavity inside the hose is thus closed off at the hose end, wherein the closing element may contain an opening for a later connection between the hose cavity and the third outlet/intake of the connector.

In another embodiment, the closing off/sealing of the hose cavity at the hose end is done by thermally deforming the hose end, such that it securely wraps around the tempering device at that hose end. As a result, connector material can be prevented from entering the cavity between tempering device and hose during the injection-molding process.

Once the cavity between tempering device and hose is closed, at least on one hose end, that hose end is inserted into an injection-molding tool, wherein the projecting section of the tempering device as well as the hose extend inside the injection-molding tool.

Additional structural components can also be inserted into the injection-molding tool to be insert-molded to the assembly during the injection-molding operation. For example, a metal part for connecting the connector to other components, may be inserted into the injection-molding tool to be insert-molded to the connector. The injection-molding tool is then closed and the connector is insert-molded during the injection-molding process, wherein the area outside the hose end where the projecting section of the tempering device and the hose end are connected is insert-molded with a polymer material. The material used to insert-mold this area is preferably selected from the group comprising polyamides, polyphenylene sulfides (PPS), polyphthalamides (PPA), polyetheretherketones (PEEK), or polyetherimides (PEI).

In connection with the invention, it was discovered that an additional form-fitting connection can be made between the closing element and the connector when projections and/or undercuts are formed onto the closing element.

After the connector is cooled down in the injection-molding tool, the assembly is removed from the tool. An opening is then made in the hose and/or the closing element on the inside of the connector in order to create a connection between the third outlet/intake of the connector and the cavity of the hose. This can preferably be achieved through drilling or stamping a hole into the hose wall through the third outlet/intake of the connector. However, this process must ensure that the tempering device on the hose inside is not damaged. For that reason, in some embodiments of the present invention, the tempering device may be positioned in the connector so that it is not located in the center of the hose, but close to the hose wall.

In one embodiment having a prefabricated opening in the closing element, the assembly is completed once the connector has cooled down.

As an alternative solution for inserting an opening to connect the hose cavity to the third outlet/intake of the connector, in some embodiments of the invention, the opening is inserted using a pusher element in the injection-molding tool through the cavity within the third outlet/intake into the hose and/or the closing element.

In some embodiments of the present invention, instead of forming and connecting the connector simultaneously during the injection-molding process of, the connector may be produced as a separate unit using an injection-molding process, and can subsequently be connected to the hose and the tempering device to create the finished assembly.

Therefore, according to another embodiment of the invention, there a method for producing an assembly for conducting and tempering a fluid, comprising: a) arranging a tempering device in a cavity of a hose with the tempering device having a projecting section that extends beyond at least one end of the hose; b) providing a connector with at least three outlets/intakes that communicate with each other via cavities on the inside of the connector, wherein a first one of the connector cavities extends from a first one of the three outlets/intakes and a cross section of the first connector cavity is adapted to match a cross-section of the hose, wherein a second one of the connector cavities is coupled to the first connector cavity, and the second connector cavity has a cross-section that is adapted to match a cross-section of the cavity of the hose, wherein a third one of the connector cavities is coupled to the second connector cavity and extends through the connector to a second one of the three outlets/intakes of the connector arranged opposite of the first outlet/intake, wherein the third connector cavity has a cross-section that matches a cross-section of the tempering device that is arranged inside the hose, and wherein a fourth one of the connector cavities communicates between the second connector cavity and a third one of the three outlets/intakes; c) applying an adhesive along a peripheral area of the first and third cavity regions; d) inserting the projecting section of the tempering device into the first outlet/intake of the connector; f) guiding the tempering device through the connector until the tempering device projects through the second outlet/intake; g) inserting the end of the hose into the first outlet/intake of the connector until end of the hose reaches the second cavity; and h) allowing the adhesive to harden.

According to an alternative embodiments of the present invention there is provided A method for producing an assembly for conducting and tempering a fluid, comprising: a) arranging a tempering device in a cavity of a hose with the tempering device having a projecting section that extends beyond at least one end of the hose; b) providing a connector with at least three outlets/intakes that communicate with each other via cavities on the inside of the connector, wherein a first one of the connector cavities extends from a first one of the three outlets/intakes and a cross section of the first connector cavity is adapted to match a cross-section of the hose, wherein a second one of the connector cavities is coupled to the first connector cavity, and the second connector cavity has a cross-section that is adapted to match a cross-section of the cavity of the hose, wherein a third one of the connector cavities is coupled to the second connector cavity and extends through the connector to a second one of the three outlets/intakes of the connector arranged opposite the first outlet/intake, wherein the connector cavity has a cross-section that matches a cross-section of the tempering device that is arranged inside the hose, and wherein a fourth one of the connector cavities communicates between the second connector cavity and a third one of the three outlets/intakes; c) inserting the projecting section of the tempering device into the first outlet/intake of the connector; d) guiding the tempering device through the connector until the tempering device projects through the second outlet/intake; e) inserting an end of the hose into the first outlet/intake of the connector until it reaches the second cavity; f) applying an adhesive to the outlets/intakes on the connector into which the tempering device and the hose are inserted; and g) allowing the adhesive to harden.

In this embodiment, once the adhesive has hardened, a material-to-material connection is established between the connector and the hose and between the connector and the tempering device.

It is also conceivable with this method that the connector is first connected to the hose and that the tempering device is subsequently introduced through the connector into the hose.

The adhesive material can furthermore be applied to the periphery of the tempering device and the hose, after the tempering device is inserted and the hose attached to the connector, so that the adhesive material creeps as a result of its viscosity into the gap between the tempering device and the connector and between the hose and the connector before hardening.

With this arrangement, however, the applied adhesive may come in contact with the fluid during the operation. Therefore, the selected adhesive must be chemically resistant to the fluid.

To circumvent this problem, the cavity regions of the connector can be provided with sealing means such as O-rings, sealing rings, or the like, which are either adapted to the hose cross section or the tempering device cross section. As a result, fluid and adhesive are separated, so that only the aforementioned sealing means must be chemically resistant to the fluid.

In embodiments of the assembly previously described, wherein the connector is connected by means of welding or gluing to at least one of the hose and the tempering device, the method for producing such assembly may be different from the methods described above.

In such embodiments, the connector may be joined by laser welding to the hose and the tempering device arranged inside the hose. In the process, the overlapping region that is created between connector and the hose and the tempering device when the hose and the tempering device are inserted into the connector is subjected to laser radiation. The connector is advantageously composed of a material that is transparent to the wavelength of the laser radiation used, so the radiation is not absorbed by the connector. The hose and the tempering device, on the other hand, absorb the radiation, so that the hose and the tempering device heat up in the region subjected to the radiation and start to melt. As a result of the heat transfer in the overlapping region, the connector material also starts to melt and, during the subsequent cooling down process, a material-to-material connection forms in the melting region between the hose, the tempering device and the connector. An example of the material combination that can be laser welded is polyamide 12 having a glass fiber share of approximately 20-30% by volume used for the connector, as well as polyamide 12 with an admixture of soot or any other suitable radiation-absorbing material used for the hose.

According to an embodiment of the present invention, it is also possible to use a radiation source that emits non-coherent radiation. The emitted radiation preferably has a spectral radiant power distribution, for which the maximum is at a wavelength in the infrared range. This permits an effective transmission of heat into the hose and the tempering device. The hose and the tempering device can be embodied so as to absorb radiation by mixing in color pigments, which additionally act as absorption centers in the polymer matrix.

In an alternative embodiment, the assembly may be produced by pushing the hose onto a nozzle formed onto the connector. The nozzle has a conical shape so that the hose is expanded and is kept in place by means of undercuts. The advantage of this form-fitting connection is that it can be detached later. The connector and the tempering device can be connected using one of the techniques previously described.

When using an electrical heat conductor as the tempering device, it is further conceivable to connect the electric heat conductor to the hose on one side because the heat conductor in the form of a coil is installed either in the outer hose or the inner hose of a hose-in-hose arrangement. As a result, the second outlet/intake of a connector can be omitted.

According to yet another embodiment of the invention, there is provided a method for producing an assembly for conducting and tempering a fluid, comprising: a) providing a hose having an outer wall enclosing a cavity; b) providing a connector with at least three outlets/intakes that communicate with each other via cavities on the inside of the connector, wherein a first one of the connector cavities extends from a first one of the three outlets/intakes and a cross section of the first connector cavity is adapted to match a cross-section of the hose, wherein a second one of the connector cavities is coupled to the first connector cavity, and the second connector cavity has a cross-section that is adapted to match a cross-section of the cavity of the hose, wherein a third one of the connector cavities is coupled to the second connector cavity and extends through the connector to a second one of the three outlets/intakes of the connector arranged opposite the first outlet/intake, wherein the connector cavity has a cross-section that matches a cross-section of the tempering device that is arranged inside the hose, and wherein a fourth one of the connector cavities communicates between the second connector cavity and a third one of the three outlets/intakes; c) gluing the hose to the connector by one of (1) applying an adhesive along a peripheral area of the first connector cavity and then inserting the hose into the first connector cavity through the first outlet/intake, or (2) inserting the hose into the first connector cavity through the first outlet/intake and subsequently applying an adhesive along the peripheral area of the first connector cavity; c) inserting a tempering device through the second outlet/intake; d) guiding the tempering device through the connector and the hose; e) applying an adhesive to an area of the second outlet/intake; and f) allowing the adhesive to harden.

BRIEF DESCRIPTION OF THE DRAWINGS

These and other features and advantages of the invention will be further understood from the following detailed description of the invention with reference to the accompanying drawings, which show in.

DETAILED DESCRIPTION

Figure 1:
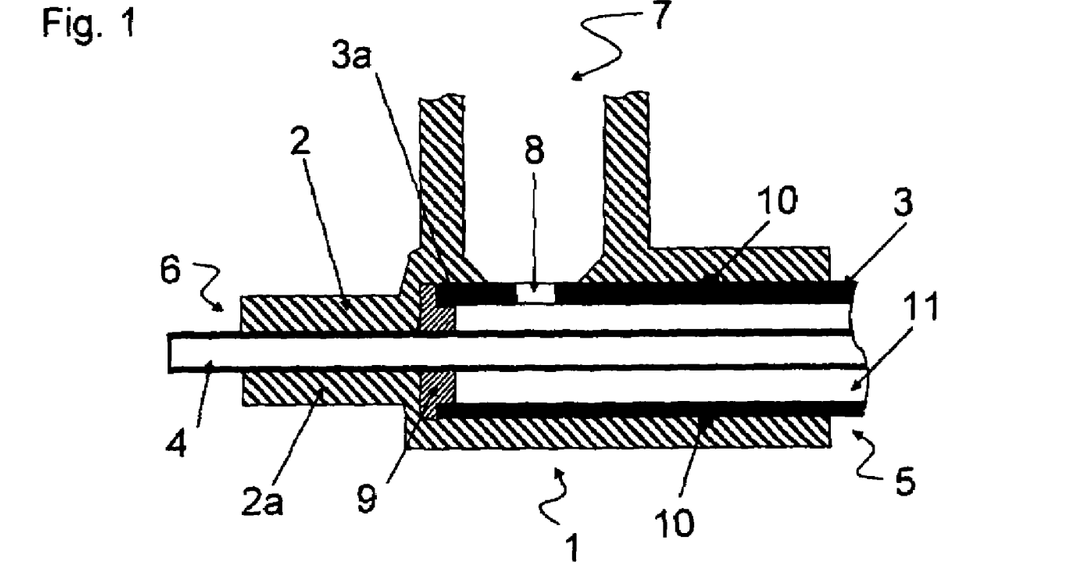
FIG. 1 depicts a section through an assembly according to the invention, provided with a closing element.

FIG. 1 shows a section through an assembly 1 having a closing element 9, according to an embodiment of the present invention. In this embodiment, the cavity 11 between the tempering device 4 and the hose 3 is closed off with a closing element 9. This closing element 9 extends into the cavity 11, so that the tempering device 4 is positioned at the end of hose 3, relative to hose 3.

The closing element 9 does not seal off the fluid, conducted through the cavity 11 between the tempering device 4 and hose 3, but can only prevent the connector material from entering the cavity 11 between tempering device 4 and hose 3, at the hose end 3a, during the injection-molding process. The sealing of the cavity 11 is achieved by insert-molding the area of transition between tempering device 4 and hose 3 during the injection-molding process.

The cavity 11 and the third outlet/intake 7 on the connector are interconnected by an opening 8, so that the fluid can be conducted unhindered from the cavity 11 through the opening 8 into the third outlet/intake 7 of the connector.

For the present example, the tempering device 4 is embodied as a hose with fluid streaming through its lumen.

To achieve a better connection between the hose 3 and the connector 2 during the insert-molding of the connector 2 in an injection-molding process, the hose 3 for this example is compressed to form a bulge 10, wherein this bulge creates a form-fitting connection between connector 2 and hose 3. The tempering device 4 can also be compressed in the region 2a, at the location for connecting the connector 2 and the tempering device, provided the tempering device is embodied as a hose. This additional form-fitting connection between the connector 2 and the hose 3 by means of a bulge 10 increases the shearing resistance at the connecting location.

Different embodiments of the third outlet/intake 7 of the connector can be adapted to suit the system's requirements, wherein additional component parts can also be insert-molded in this region using the injection-molding process.

It is furthermore conceivable that additional outlets/intakes with cavities 11 may be implemented between the tempering device 4 and the hose 3, so that the first outlet/intake 5 is divided into multiple branches. The angle enclosed between the third outlet/intake 7 of the connector and the first and/or second outlet/intake 5, 6 can also be varied. It is particularly advantageous for creating the opening 8 if the third outlet/intake 7 is arranged perpendicular to the two other outlets/intakes 5, 6.

Figure 2:
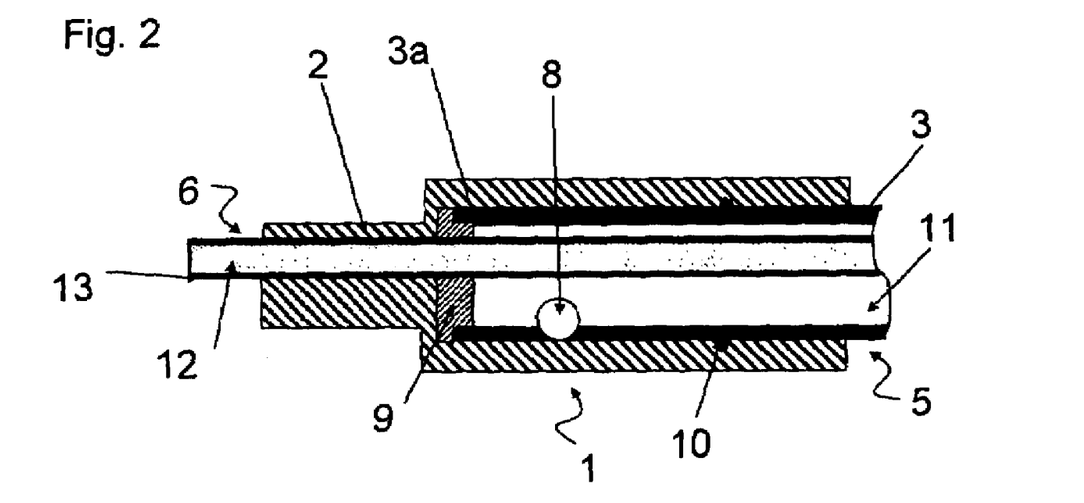
FIG. 2 depicts a section through an assembly according to the invention, with a heat conductor installed off center.

FIG. 2 shows a section through an assembly 1 according to an embodiment of the present invention, having an off-center arranged tempering device 12, which is embodied as electrical heat conductor 12. To prevent corrosion of the heat conductor 12, the electrical heat conductor 12 is wrapped with an insulating layer 13, which is diffusion-tight and resistant to the conducted fluid. In this example, the heat conductor 12 is not arranged in the center of the hose 3, thus creating a larger distance between hose inside wall and tempering device 4 in the region of opening 8. As a result, it is less likely to damage the tempering device 4 during the insertion of the opening 8 into the hose 3. The tempering device 4 is moved with the closing element 9 to the off-center position, thereby defining the position of the electrical heating wire 12 at the end of the hose 3.

The hose 3 for this example may also be compressed, so that a form-fitting connection is generated between hose 3 and connector 2, which supports the material-to-material connection created during the insert-molding of the connector 2 during the injection-molding process.

Figure 3:
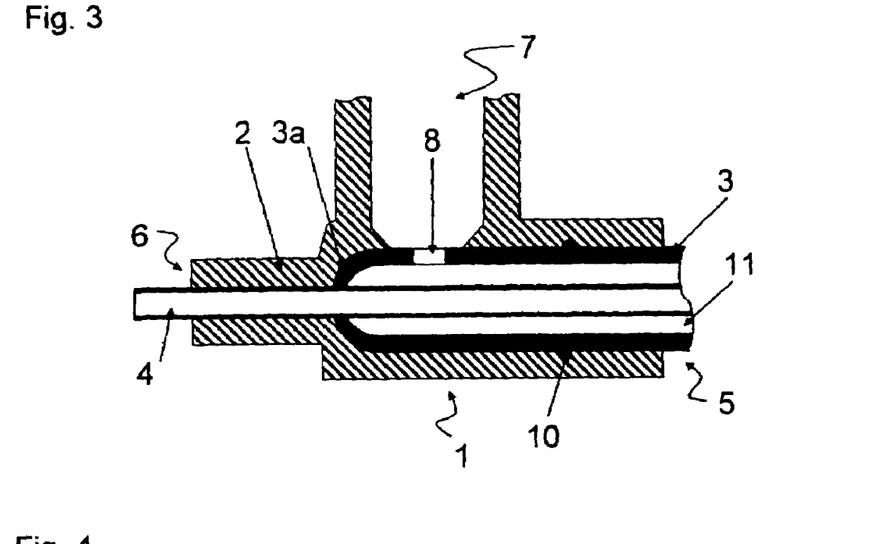
FIG. 3 depicts a section through an assembly according to the invention, with a thermally closed hose.

FIG. 3 shows a section through an assembly 1 according to an embodiment of the present invention, provided with a thermally deformed hose 3. For this exemplary embodiment, the hose end 3a is not closed off by a closing element 9, but by the thermally deformed hose end 3a. As a result of the thermal deformation of the hose end 3a, the hose 3 comes in contact with the tempering device 4, arranged on its inside. The cavity 11 between the tempering device 4 and the hose 3 is thus closed off at the hose end 3a, so that no connection material, or very little connection material, can enter this cavity 11 during the insert-molding process, thus ensuring that a connection to the hollows space 11 can be created when the opening 8 is inserted.

Figure 4:
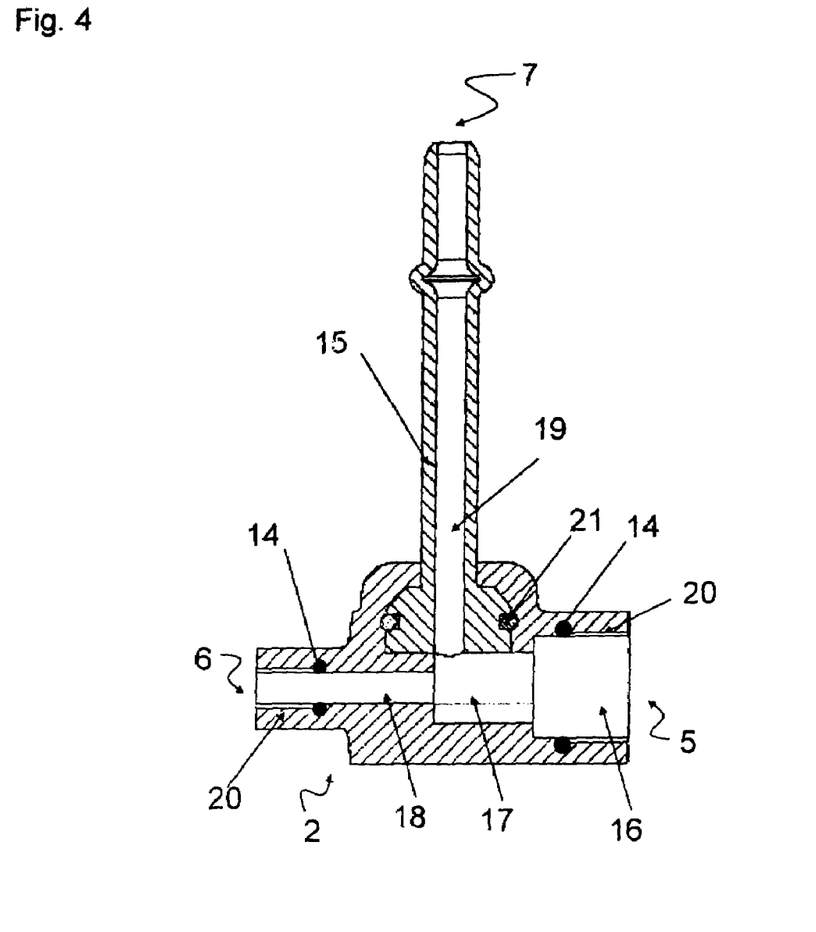
FIG. 4 depicts a section through a connector with an O-ring.

FIG. 4 shows a connector 2 that can be connected to a hose 3. The connector 2 is provided with three outlets/intakes 5, 6, 7, which are connected to one another via the cavities 16, 17, 18, 19 on the inside of the connector 2. When producing the connector 2, a component 15 is inserted into the injection-molding form, so that it is form-fittingly connected to the connector 2. A sealing device 21, preferably an O-ring, is insert-molded along with the connector in order to seal the contact surfaces between connector 2 and component 15. The assembly can be connected, for example, to a nozzle or a supply container/tank, with the aid of the inserted component 15.

The cross section of a cavity 16 on an outlet/intake 5 of the connector 2 is adapted to match the cross section of the hose 3 to be connected thereto (not shown in further detail herein). To position this hose 3 in the connector 2, the cross section of cavity 17, adjacent to cavity 16, adapted to be smaller by the thickness of the wall of the hose 3, so that the cross section of cavity 17 matches the cross section of cavity 11 of the hose 3. As a result, any fluid conducted through the hose 3 can flow unhindered.

The second cavity 17 is connected through cavity 19 in the component 15 to a third outlet/intake 7 of the connector 2. An additional cavity 18, having a cross section that is adapted to match the cross section of the tempering device 4, 12 (not shown in further detail herein), adjoins the centrally located cavity 17 of the connector 2 and functions to enclose the tempering device 4, 12, arranged on the hose 3 inside, and guide it through the second outlet/intake 6.

The connector is configured such that an adhesive can be applied to the peripheral regions 20 of the cavities 16, 18, which are adapted to the cross sections of hose 3 and tempering device 4, 12. The adhesive can be applied before the hose 3 and the tempering device 4, 12 are inserted. However, the adhesive can also be applied after the insertion of the tempering device 4, 12 and the hose 3 because it will penetrate the peripheral regions 20 of the cavities 16, 18 as a result of the creep.

It has proven advantageous to insert a fluid-resistant sealing means 14, such as an O-ring adapted to match the cross sections of the hose 3 and the tempering device 4, 12, into the cavities 16, 18 of the connector 2. The adhesive used consequently does not come directly into contact with the fluid, so that the adhesive does not need to be chemically resistant to the fluid.

Figure 5:
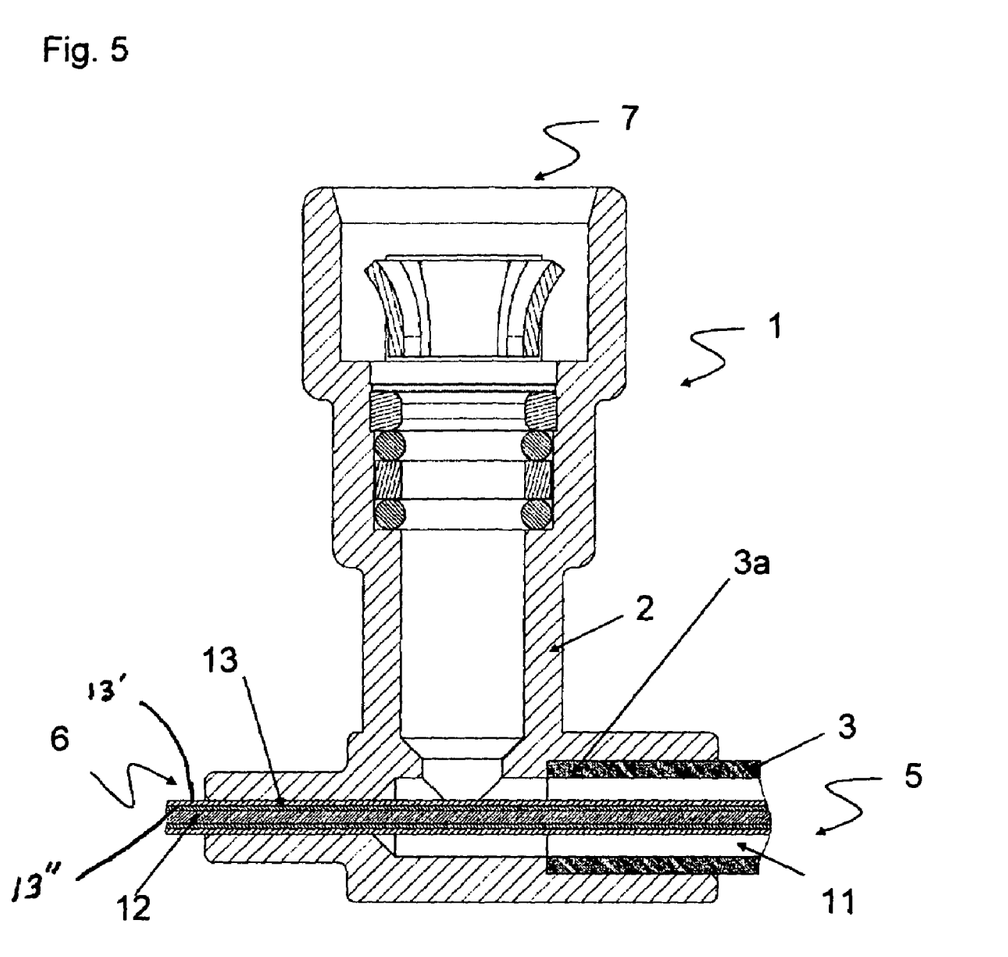
FIG. 5 depicts a section through a connector that is laser-welded to the hose and the tempering device.

The materials used for the assembly 1 according an embodiment of the present invention depicted in FIG. 5 are selected based on the characteristics for conducting and tempering a carbamide-water solution. As a result, the connector 2, the hose 3, and the insulating layer 13 of the electrical heat conductor 12, which comes in contact with the fluid, are produced from a polyamide 12. This material prevents diffusion and shows a good chemical resistance to the carbamide-water solution. The insulating layer 13 for the tempering device 4 is composed of two layers for this embodiment, wherein the outer layer 13' is composed of a polyamide and the inner layer 13" is composed of a polytetrafluoroethylene. The connector 2 is laser-welded (not shown in further detail herein) to the hose 3 and the tempering device 12, wherein the connector 2 is composed of a PA 12 material, transmissible to the wavelength of the laser radiation.

It will be understood that the above description of the present invention is susceptible to various modifications, changes and adaptations, and the same are intended to be comprehended within the meaning and range of equivalents of the appended claims.

What is claimed is:

1. An assembly for conducting and tempering a fluid, comprising:
   at least one connector having at least three outlets/intakes;
   at least one hose having an outer wall enclosing a cavity and being attached to a first one of the outlets/intakes of the at least one connector; and
   at least one tempering device arranged inside the cavity of the hose and extending outside the hose through a second one of the outlets/intakes of the connector positioned approximately opposite the first outlet/intake, the fluid being conducted in the cavity of the hose between the outer wall and the tempering device;
   wherein a third one of the outlets/intakes of the connector communicates with the cavity of the hose, and the hose and tempering device are each connected to the connector by one of a form-fitting or material-to-material connection.

2. The assembly according to claim 1, wherein the tempering device comprises an electrical heat conductor.

3. The assembly according to claim 2, wherein the electrical heat conductor comprises at least one insulation/diffusion barrier layer.

4. The assembly according to claim 1, wherein the tempering device comprises a second hose.

5. The assembly according to claim 4, wherein the second hose is adapted to conduct a fluid or gaseous medium for the tempering.

6. The assembly according to claim 4, wherein the tempering device comprises at least one electrical heat conductor arranged in the second hose.

7. The assembly according to claim 2, wherein the electrical heat conductor comprises a metal alloy.

8. The assembly according to claim 4, wherein at least one of the hose and the second hose comprises several layers.

9. The assembly according to claim 8, wherein at least one of the layers comprises a reinforcing layer.

10. The assembly according to claim 4, wherein at least one of the connector, hose and second hose comprises a material selected from the group comprising polyamides, polyphenylene sulfides (PPS), polyphthalamides (PPA), polyetheretherketones (PEEK), or polyetherimides (PEI).

11. The assembly according claim 4, wherein the at least one of the hose and second hose includes a marking affixed to thereto.

12. The assembly according to claim 11, wherein the marking is one of printed on or stamped in.

13. The assembly according to claim 4, wherein at least one of the hose and second hose is embodied with a color or multiple colors and/or is provided with characterizing patterns.

14. The assembly according to claim 1, further including a protective thermal sleeve arranged around at least some sections of the assembly.

15. The assembly according to claim 1, wherein the connection between the connector and at least one of the hose or the tempering device comprises a weld or a glue connection.

16. A method for producing the assembly of claim 1, comprising:
   a) arranging the tempering device in the cavity of the hose with the tempering device having a projecting section that extends beyond at least one end of the hose;
   b) closing off the cavity between the tempering device and the hose on the one end of the hose;
   c) inserting the closed end of the hose with the tempering device projecting therefrom into a cavity of an injection-molding tool so that the tempering device and the hose project out of the cavity of the injection molding tool, the cavity of the injection molding tool being shaped to form the connector;
   d) injection molding the connector while simultaneously insert-molding an area of transition between the tempering device and the closed end of the hose to form the connection between the hose and the connector and between the connector and the tempering device to form an assembly comprising the connector, tempering device and hose;
   e) removing of the assembly from the injection-molding tool once it has cooled down; and
   f) creating an opening that communicates with the cavity of the hose and the third outlet/intake of the connector.

17. The method according to claim 16, further including inserting at least one additional structural component into the injection-molding tool and insert-molding the additional structural component for connecting the connector to other components.

18. The method according to claim 16, wherein step b) includes closing off the cavity between the tempering device and the hose at the one end of the hose with a closing element prior to the insert-molding.

19. The method according to claim 16, including carrying out step (f) during the insert-molding of the area of transition and carrying out step (d) using a pusher element of the injection-molding tool.

20. The method according to claim 16, including thermally forming a tip onto the one end of the hose with the tip ending on the tempering device, thereby closing off the cavity between tempering device and the hose.

21. A method for producing an assembly for conducting and tempering a fluid, comprising:
   a) arranging a tempering device in a cavity of a hose with the tempering device having a projecting section that extends beyond at least one end of the hose;
   b) providing a connector with at least three outlets/intakes that communicate with each other via cavities on the inside of the connector, wherein a first one of the connector cavities extends from a first one of the three outlets/intakes and a cross section of the first connector cavity is adapted to match a cross-section of the hose, wherein a second one of the connector cavities is coupled to the first connector cavity, and the second connector cavity has a cross-section that is adapted to match a cross-section of the cavity of the hose, wherein a third one of the connector cavities is coupled to the second connector cavity and extends through the connector to a second one of the three outlets/intakes of the connector arranged opposite of the first outlet/intake, wherein the third connector cavity has a cross-section that matches a cross-section of the tempering device that is arranged inside the hose, and wherein a fourth one of the connector cavities communicates between the second connector cavity and a third one of the three outlets/intakes;
   c) applying an adhesive along a peripheral area of the first and third cavity regions;
   d) inserting the projecting section of the tempering device into the first outlet/intake of the connector;
   f) guiding the tempering device through the connector until the tempering device projects through the second outlet/intake;
   g) inserting the end of the hose into the first outlet/intake of the connector until end of the hose reaches the second cavity; and
   h) allowing the adhesive to harden.

22. A method for producing an assembly for conducting and tempering a fluid, comprising:
   a) arranging a tempering device in a cavity of a hose with the tempering device having a projecting section that extends beyond at least one end of the hose;
   b) providing a connector with at least three outlets/intakes that communicate with each other via cavities on the inside of the connector, wherein a first one of the connector cavities extends from a first one of the three outlets/intakes and a cross section of the first connector cavity is adapted to match a cross-section of the hose, wherein a second one of the connector cavities is coupled to the first connector cavity, and the second connector cavity has a cross-section that is adapted to match a cross-section of the cavity of the hose, wherein a third one of the connector cavities is coupled to the second connector cavity and extends through the connector to a second one of the three outlets/intakes of the connector arranged opposite the first outlet/intake, wherein the connector cavity has a cross-section that matches a cross-section of the tempering device that is arranged inside the hose, and wherein a fourth one of the connector cavities communicates between the second connector cavity and a third one of the three outlets/intakes;

c) inserting the projecting section of the tempering device into the first outlet/intake of the connector;

d) guiding the tempering device through the connector until the tempering device projects through the second outlet/intake;

e) inserting an end of the hose into the first outlet/intake of the connector until it reaches the second cavity;

f) applying an adhesive to the outlets/intakes on the connector into which the tempering device and the hose are inserted; and g) allowing the adhesive to harden.

23. A method for producing an assembly for conducting and tempering a fluid, comprising:

a) providing a hose having an outer wall enclosing a cavity;

b) providing a connector with at least three outlets/intakes that communicate with each other via cavities on the inside of the connector, wherein a first one of the connector cavities extends from a first one of the three outlets/intakes and a cross section of the first connector cavity is adapted to match a cross-section of the hose, wherein a second one of the connector cavities is coupled to the first connector cavity, and the second connector cavity has a cross-section that is adapted to match a cross-section of the cavity of the hose, wherein a third one of the connector cavities is coupled to the second connector cavity and extends through the connector to a second one of the three outlets/intakes of the connector arranged opposite the first outlet/intake, wherein the connector cavity has a cross-section that matches a cross-section of the tempering device that is arranged inside the hose, and wherein a fourth one of the connector cavities communicates between the second connector cavity and a third one of the three outlets/intakes;

c) gluing the hose to the connector by one of (1) applying an adhesive along a peripheral area of the first connector cavity and then inserting the hose into the first connector cavity through the first outlet/intake, or (2) inserting the hose into the first connector cavity through the first outlet/intake and subsequently applying an adhesive along the peripheral area of the first connector cavity;

c) inserting a tempering device through the second outlet/intake;

d) guiding the tempering device through the connector and the hose;

e) applying an adhesive to an area of the second outlet/intake;

f) allowing the adhesive to harden.

24. The method according to claim 21, further including: inserting first and second sealing devices into the first and third connector cavities, respectively, the first and second sealing devices each having a cross-section corresponding to a cross-section of the hose and the tempering device, respectively.

25. The method according to claim 22, further including: inserting first and second sealing devices into the first and third connector cavities, respectively, the first and second sealing devices each having a cross-section corresponding to a cross-section of the hose and the tempering device, respectively.

26. The method according to claim 23, further including: inserting first and second sealing devices into the first and third connector cavities, respectively, the first and second sealing devices each having a cross-section corresponding to a cross-section of the hose and the tempering device, respectively.

* * * * *